March 6, 1956        D. JACKSON        2,737,379
LONGWALL MINING MACHINE SLIDABLE ON A CONVEYOR
Filed Dec. 19, 1951        2 Sheets-Sheet 1
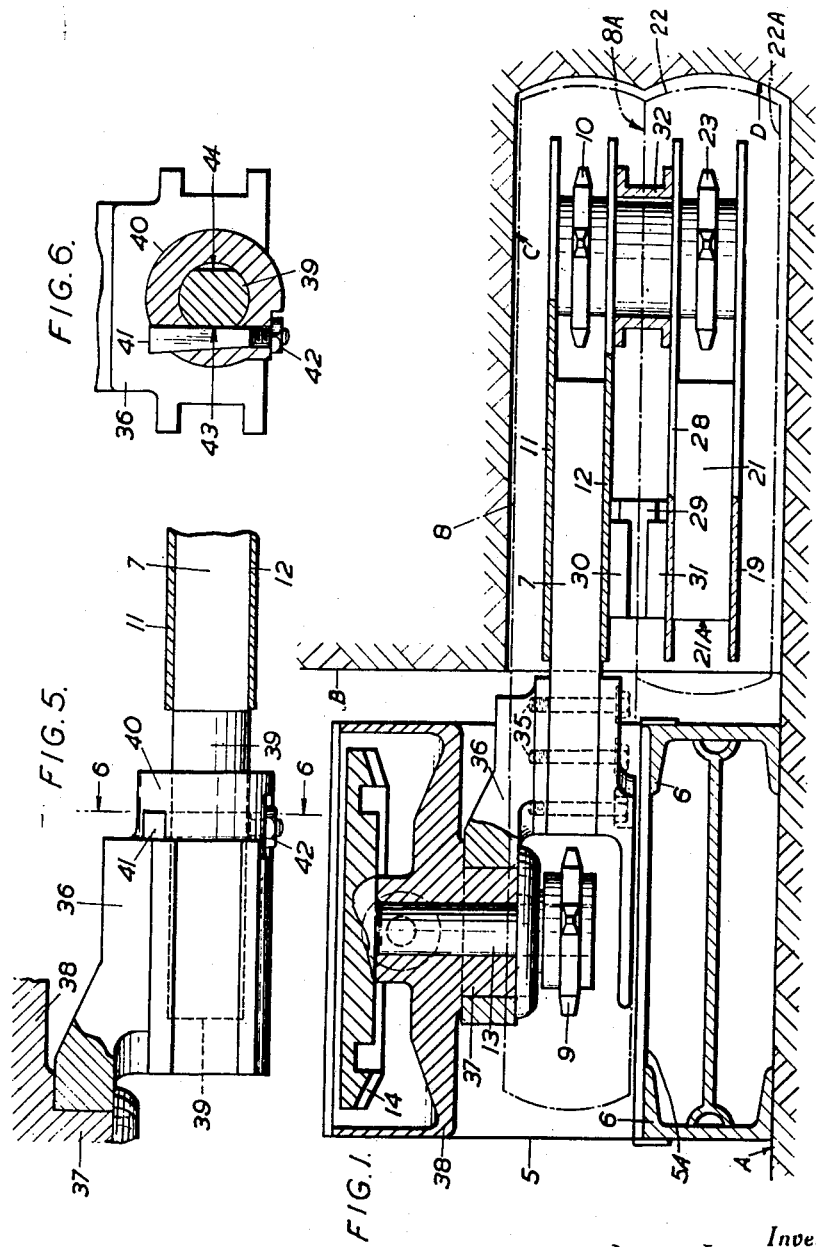
Inventor:
DAVID JACKSON
By Richardson, David and Nordon
Attorneys

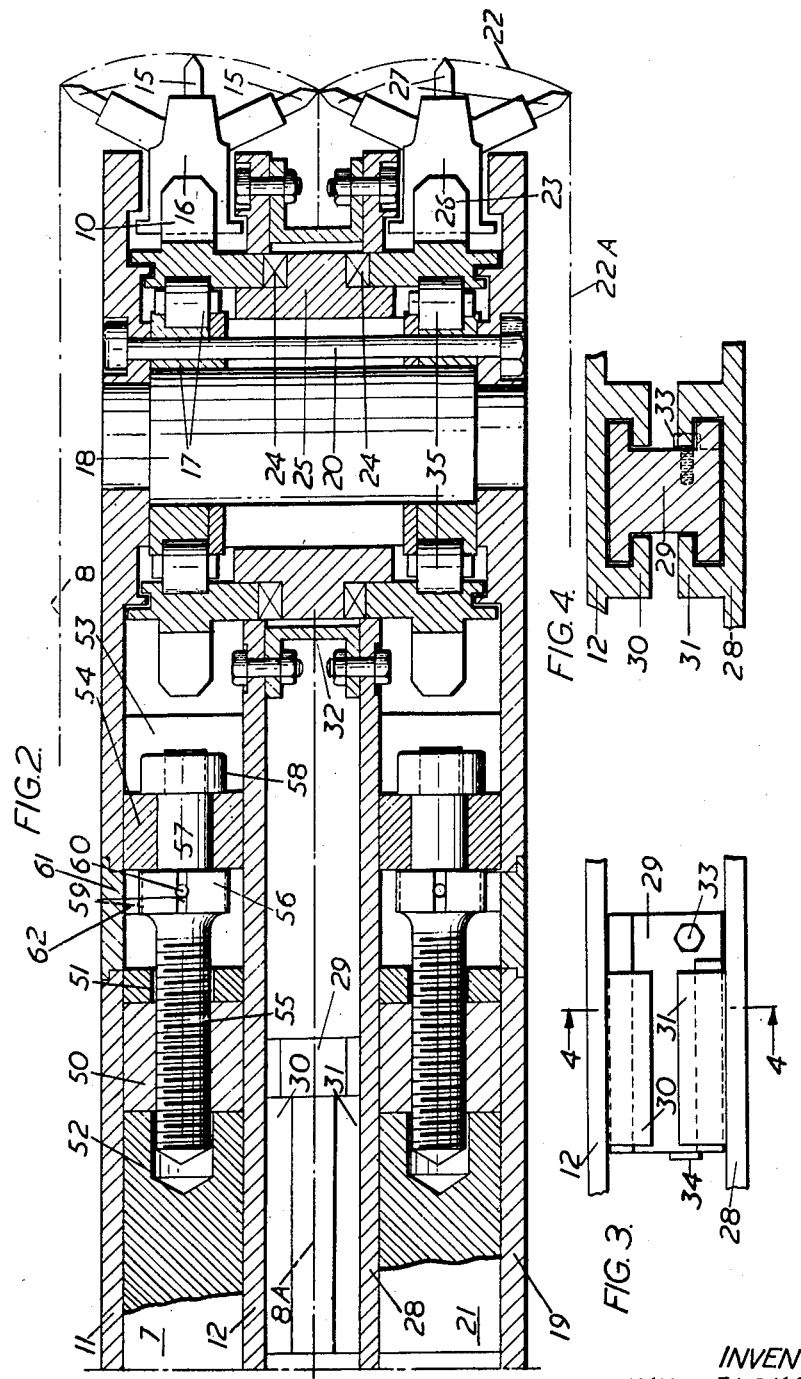

United States Patent Office 2,737,379
Patented Mar. 6, 1956

2,737,379

LONGWALL MINING MACHINE SLIDABLE ON A CONVEYOR

David Jackson, Glasgow, Scotland, assignor to Mavor & Coulson Limited, Glasgow, Scotland Application December 19, 1951, Serial No. 262,400

Claims priority, application Great Britain December 29, 1950

5 Claims. (Cl. 262—30)

This invention relates to coal-cutters of the type comprising a jib with an endless travelling cutter chain provided with projecting picks which cut out a kerf in the face of a coal or other mineral seam to be mined.

In the system of coal-mining known as "continuous mining" there has come into use the combination of a face conveyor and a coal-cutter of the type stated, the arrangement being such that the frame of the conveyor serves as a guide and support for the coal-cutter. Seeing that the coal-cutter is mounted upon and rides along the conveyor, the cutter chain cuts a kerf at a level substantially above floor level. Thus, there is left below the kerf a thickness of coal, say a layer some seven inches thick, which may present difficulties as regards the work of breaking it from the stone floor.

The present invention comprises a coal-cutter of the type stated designed for the continuous mining system and characterised by an auxiliary jib which is supported below the main jib and which has a cutter chain that is driven by the main cutter chain. The function of the auxiliary jib and its cutter chain is to cut away the layer of mineral between the level of the main cutter and the floor.

In such a coal-cutter it will be desirable to make provision for flitting; that is to say, for returning the coal-cutter idly after it has completed its working travel along the conveyor frame from start to finish of the face of the seam and has been withdrawn sidewise, with the conveyor, into a position clear of the seam.

Therefore the present invention also comprises a coal-cutter of the type stated and characterised by an auxiliary jib as aforesaid, in which the main jib is rotatable, having a normally locked horizontal-axis connection with a vertical-axis turret, or so-called "jib-head," swivel-mounted on the body of the machine, and carries a cutter chain of which the links can be detached from each other. The arrangement is such that, in order to set the machine for flitting, selected links of the main cutter chain are detached, the main jib is unlocked and rotated a half turn, thus bringing the auxiliary jib above the main jib, and the turret is swivelled a quarter turn, thus swinging the main and auxiliary jib assembly over the conveyor.

An example of a coal-cutter according to the invention is shown in the accompanying drawings, in which:

Fig. 1 is a simplified vertical section through the body and a jib of the coal-cutter and through a face conveyor on which the coal-cutter is mounted.

Fig. 2 is a section of the jib as viewed in Fig. 1 but showing the parts in greater detail and to a larger scale.

Fig. 3 is an elevation of a portion of Fig. 1 also showing the parts in greater detail and to a larger scale; and Fig. 4 is a section on the line 4—4 of Fig. 3.

A modification is illustrated by Figs. 5 and 6, of which Fig. 5 is a fragmentary view of a form of connection between the jib and the turret carrying it; and Fig. 6 is a section on the line 6—6 of Fig. 5.

In the example shown in Figs. 1 to 4, the coal-cutter is designed for use in combination with the frame of a face conveyor of the scraper class in such a manner that the body 5 of the coal-cutter can be hauled along the flanged side longitudinals 6 of the conveyor frame whilst the frame is located in the usual way on the stone mine floor A alongside a coal face B (Fig. 1). As Fig. 1 shows, the base 5A of the coal-cutter body 5, being slidable along the longitudinals 6, is designed to move at a level a substantial amount above the level of the floor A. The coal-cutter has a short transverse jib 7 with an endless cutter chain the limit of which is indicated in Fig. 1 by the dot-dash line 8. As is customary, this jib 7 is arranged so that its cutter chain 8 works down to a level 8A which is almost as low as the bottom of the base 5A. This chain is as usual forced by the cutter motor (not shown) to travel in its endless path round the jib under the support and guidance of a driving sprocket wheel 9 at the pivot or inner end of the jib, a driven sprocket wheel 10 at the free or outer end, and upper and lower plates 11 and 12. As Fig. 1 shows, the driving sprocket wheel 9 is on a short vertical shaft 13 which is rotated by a motor-driven bevel gearwheel 14. The plates 11 and 12 are longitudinally slidable relative to the jib body 7, so that the jib may be shortened or lengthened.

Fig. 2 shows the cutter tools 15. They project in groups of three from an endless series of tool-holding boxes, one of which is indicated by 16, which engage with teeth of the sprocket wheels 9, 10. The driven sprocket wheel 10 is journalled on a roller bearing 17 mounted at the upper end of a vertical axle 18. In the example, this axle 18 is located between the upper jib plate 11 and a bottom plate 19 bolted at 20 to the plate 11.

Immediately below the jib 7 an auxiliary jib 21 is provided. The auxiliary jib has a cutter chain the limit of which is indicated by the dot-dash line 22 in Fig. 1. This jib 21 is so arranged that its cutter chain 22 works down to a level 22A which is almost as low as the floor level A and which therefore is a substantial amount below the bottom of the base 5A. This chain is led round an end sprocket wheel 23 which is co-axial with the driven sprocket wheel 10 of the main jib 7. The co-axial sprocket wheels 10, 23, which are at the outer end of the two jibs 7, 21 are both keyed at 24 to an intermediate rotatable sleeve coupling 25, so that the outer auxiliary sprocket wheel 23 is driven by the main cutter chain 8 and drives the auxiliary cutter chain 22.

In the example, the cutter chains of both jibs have the same construction. The boxes 26 carrying the cutter tools 27 are supported and guided by the outer sprocket wheel 23 and by jib plates, the lower of which is the plate 19 and the upper of which is a plate 28. This upper plate with the lower plate 19 are slidable as a unit relatively to the jib body 21 so that this jib can be shortened or lengthened. The plate 28 of the auxiliary jib is slidably attached to the plate 12 of the main jib by a sliding coupling 29, which is a flanged block or key that engages in flanged slideways 30, 31 provided for it on the plates 12, 28. These plates 12, 28 are also rigidly bolted together at their outer ends by a flanged ring 32. The provision of a rigid connection at the outer ends of the jibs and a sliding connection at their inner ends is because each jib, in practice, will incorporate any customary adjustment means for shortening or lengthening the jib in order to stretch the cutter chain at the correct tightness.

In Fig. 2, conventional means are shown for shortening and lengthening the two jibs. Seeing that both means are the same, only one of them need be described.

The main jib 7 has fixed into its body a stationary nut 50. This nut is interposed between the jib plates 11 and 12 above and below it. The screw-threaded hole through the nut registers with slightly larger holes 51 and 52 in the jib body. The outer end of the jib body has a recess 53 in which there is slidably accommodated a thrust bearing 54, which is secured between the plates 11 and 12. The adjustment means includes a bolt consisting of a screw-threaded portion 55, a middle enlargement 56, a journal 57 and an end collar 58. The portion 55 is screwed through the nut 50. The journal 57 is freely rotatable in the bearing 54. The enlargement 56 has longitudinal grooves 59 and a diametral hole 60 in each groove. A plate 61 covering an opening in the upper jib plate 11 is detachable to expose the enlargement 56, so that a tool can be inserted into the then uppermost hole 60 to turn the bolt. A protuberance 62 on the cover plate engages the uppermost groove 59 and so locks the bolt against rotation. It will be manifest that a worker can turn the bolt in either direction to shorten or lengthen the jib.

In the adjustment means of the auxiliary jib 21, 28, the cover plate is in the lower plate 19.

The screw-pin head 33 and lug 34 shown in Figs. 3 and 4 on the block 29 are stops which are engageable with opposite ends of one of the slideway flanges 31 to limit the range of movement of the block relative to the two slideways.

The sprocket wheel 23 is journalled on a roller bearing 35 mounted on the axle 18. At the inner end of the auxiliary jib, in the example, there is no sprocket-wheel, the cutter chain there passing around the semi-circular ends 21A of the jib 21.

In use of the coal-cutter, the main cutter chain 8 cuts a kerf C at a level above the floor A, and the auxiliary cutter chain 22 cuts away the layer D which otherwise would be left below the kerf C.

In the example, the jib 7 is shown secured rigidly by long set screws 35 to the usual turret, or jib-head, 36 which carries the jib. The turret 36 is swivel-mounted on a boss 37 which provides a bearing for the shaft 13 and which projects from a casing 38 that is a portion of the machine body 5. Such a construction is conventional in coal-cutters of the type to which this invention relates. Moreover, as is usual, locking means are provided to lock the turret 36 in either of two positions, at a right angle to each other, into which such a turret ordinarily can be swivelled, the said locking means not being shown in the drawings.

A disadvantage of the foregoing construction is that it would be inconvenient to flit the coal-cutter. In order to adapt it for convenient flitting, a construction such as exemplified by Figs. 5 and 6 can be adopted.

Referring therefore to Figs. 5 and 6, parts similar to those already shown in Fig. 1 are indicated by the same numerals. As shown, the main, or upper, jib 7 of the coal-cutter is a heavy horizontal bar, mainly of rectangular section. This bar has a long heavy spigot 39 of circular section A horizontal radial socket 40 on the swivel-mounted turret 36 forms a bearing for the spigot 39. A key, or cotter, 41 with a nut 42 normally secures the spigot 39 rigidly in the socket 40, this key being fitted through an appropriate hole in the socket and engaging a keyway 43, one of two opposed keyways in the spigot.

The cutter chain of the main jib (the outline of this chain being indicated by 8 in Fig. 1) is of any usual construction such that any link of the chain can be readily detached from a neighbouring link.

In order to flit the machine from one end of the seam to the other, or to transport the machine for any reason along the conveyor, the conveyor section supporting the machine for the time being is displaced sidewise sufficiently to position the machine with its extending cutter chains 8, 22 clear of the coal face B. Thereafter, a link of the main cutter chain is detached from another and the chain removed. The key 41 is withdrawn, the total jib assembly (that is, the upper and lower jibs 7 and 21, Fig. 1, and the parts carried by them) is rotated a half-turn (about 180°) about the horizontal axis of the spigot-and-socket connection 39, 40 and the key 41 is reinserted. this time engaging the other key way 44. Thus, the auxiliary jib is brought above the main jib. The turret 36 is unlocked and swivelled a quarter-turn (about 90°) and locked. Thus, the total jib assembly is swung over the conveyor (the longitudinals of which are indicated by 6 in Fig. 1). The displaced conveyor section is restored to any desired relationship with the adjoining sections. The machine can now be flitted by transporting it along the conveyor.

The unlocking, swivelling and locking of the turret 36 are performed in any customary way.

In order to set the machine for its next working travel, the turret is unlocked, swivelled sidewise to the appropriate working position and locked there; the jib assembly is unlocked by withdrawal of the key 41, rotated a half-turn and locked again, the auxiliary jib now being below the main jib; and the main cutter chain is replaced.

If expedient, for each flitting operation, the main-cutter-chain may have its links detached at two places at opposite sides of the main jib and the chain left in position during rotation of the jib assembly, swivelling of the turret and flitting of the coal-cutter.

I claim:

1. A mining machine designed for use in association with a conveyor to be arranged upon a mine floor alongside the face of a seam of mineral to be mined in the continuous longwall mining system, said machine comprising a longitudinal body with a base adapted to sit at a raised level upon said conveyor, said body being movable along the frame of said conveyor, a main jib which in its working position extends transversely from the machine body, an auxiliary jib arranged directly below the main jib and connected thereto, main and auxiliary cutter chains movable in endless tracks provided by said main and auxiliary jibs respectively, the auxiliary jib and its cutter chain being located, when the main jib is in its working position, laterally clear of the machine body so as to be clear of the conveyor also, means for driving the main cutter chain round its endless track, said main jib being so arranged that said main cutter chain works at a level nearly co-planar with the base of the machine body, and a driving connection between said main and auxiliary cutter chain for circulating the auxiliary cutter chain round its endless track to work at a level below the base of the machine body so as to cut away a layer of mineral without intervening slab formation between the raised level of said base and the mine floor.

2. A mining machine designed for use in association with a conveyor to be arranged upon a mine floor alongside the face of a seam of mineral to be mined in the continuous longwall mining system, said machine comprising a longitudinal body with a base adapted to sit at a raised level upon said conveyor, said body being movable along the frame of said conveyor and comprising a main jib which in its working position extends transversely from the machine body, a pair of guide plates arranged as upper and lower portions of said main jib, an auxiliary jib arranged directly below the main jib, a pair of guide plates arranged as upper and lower portions of said auxiliary jib, main and auxiliary cutter chains movable in endless tracks provided by said pairs of guide plates respectively, each of said jibs being extensible and contractible to regulate the tension of the associated one of said cutter chains, means for driving the main cutter chain round its endless track, said main jib being so arranged that said main cutter chain works at a level nearly co-planar with the base of the machine body, a driving connection between said main and auxiliary cutter chains for circulating the auxiliary cutter chain round its endless track to work at a level below the base of the machine body so as to cut away a layer of mineral without intervening slab formation between the raised level of said base and the mine floor, a connector rigidly securing said pairs of guide plates rigidly together at the outer ends of said jibs, and a support slidably interconnecting said pairs of plates towards their inner ends so that neither jib can prevent longitudinal extension or contraction of the other.

3. A mining machine designed for use in association with a mineral-face conveyor to be arranged upon a mine floor alongside the face of a seam of mineral to be mined in the continuous longwall mining system, said machine being movable along the frame of said conveyor and comprising a longitudinal body in the form of a casing, a base on said casing adapted to sit at a raised level upon said conveyor frame and to move along said frame, a turret which is mounted in said casing to swivel about a vertical axis, a main jib which in its working position extends transversely from the machine body, an auxiliary jib arranged directly below the main jib and connected thereto, main and auxiliary cutter chains movable in endless tracks provided by said main and auxiliary jibs respectively, the auxiliary jib and its cutter chain being located, when the main jib is in its working position, laterally clear of the machine body so as to be clear of the conveyor also, means for driving the main cutter chain round its endless track, said main jib being so arranged that said main cutter chain works at a level nearly co-planar with said base, a driving connection between said main and auxiliary cutter chain so that the auxiliary cutter chain works at a low level below said base and co-operates with the main cutter chain to cut away the layer of mineral between the level of the base and the mine floor, a horizontal-axis pivotal connection between said main jib and said turret, said axis being transverse in the working position of the main jib, the connection being such that the auxiliary jib can be brought from its low working level to a position above the level of the frame of the conveyor, and means normally locking said main jib against pivotal movement relatively to said turret.

4. A mining machine according to claim 1 including also a turret which is swivel-mounted in the machine body so as to be turnable about a vertical axis, a connection between the main jib and said turret, said connection having a normally transverse horizontal axis about which the main jib is turnable to bring the auxiliary jib into a high level position above the conveyor frame level, and means for locking the main jib to the turret in either the normal low-level working position of the main jib or the high-level position thereof.

5. A mining machine according to claim 2 including also a turret which is swivel-mounted in the machine body so as to be turnable about a vertical axis, a connection between the main jib and said turret, said connection having normally transverse horizontal axis about which the main jib is turnable to bring the auxiliary jib into a high level position above the conveyor frame level, and means for locking the main jib to the turret in either the normal low-level working position of the main jib or the high-level position thereof.

References Cited in the file of this patent

UNITED STATES PATENTS

| 1,871,638 | Vodoz | Aug. 16, 1932 |
| 2,283,212 | Joy | May 19, 1942 |
| 2,291,633 | Joy | Aug. 4, 1942 |

FOREIGN PATENTS

| 601,416 | Great Britain | May 9, 1948 |